United States Patent
Salurso et al.

(10) Patent No.: US 7,113,738 B2
(45) Date of Patent: Sep. 26, 2006

(54) DECISION SUPPORT METHOD FOR PLANNING BROADCAST TRANSMISSIONS

(75) Inventors: Marianna Salurso, Cassina d'Agno (CH); Silvia Conti, Lugano (CH); Enrico Gulfi, Caslano (CH)

(73) Assignee: The Fantastic IP GmbH, Zug (CH)

( * ) Notice: Subject to any disclaimer, the term of this patent is extended or adjusted under 35 U.S.C. 154(b) by 455 days.

(21) Appl. No.: 09/738,390

(22) Filed: Dec. 15, 2000

(65) Prior Publication Data

US 2002/0111134 A1   Aug. 15, 2002

(51) Int. Cl.
*H04H 1/00*   (2006.01)
*H04N 5/217*   (2006.01)

(52) U.S. Cl. .................... 455/3.01; 455/419; 455/3.03; 455/452.2; 725/38; 725/39

(58) Field of Classification Search .............. 455/3.06, 455/3.01, 418, 419, 466, 77, 137, 3.04, 412, 455/420, 515, 3.05, 3.03, 427, 426.2, 452.1, 455/452.2, 507, 509, 510; 725/39, 93, 61, 725/62, 91, 94, 87, 98, 97, 38, 37, 40, 46, 725/51

See application file for complete search history.

(56) References Cited

U.S. PATENT DOCUMENTS

| | | | |
|---|---|---|---|
| 5,659,350 A | | 8/1997 | Hendricks et al. |
| 5,790,070 A | * | 8/1998 | Natarajan et al. .......... 455/13.3 |
| 6,016,311 A | * | 1/2000 | Gilbert et al. .............. 370/280 |
| 6,041,359 A | * | 3/2000 | Birdwell ..................... 709/238 |
| 6,211,901 B1 | * | 4/2001 | Imajima et al. ............... 725/93 |
| 6,256,509 B1 | * | 7/2001 | Tanaka et al. .............. 455/515 |
| 6,374,405 B1 | * | 4/2002 | Willard ........................ 725/94 |
| 6,477,707 B1 | * | 11/2002 | King et al. .................... 725/97 |
| 6,501,770 B1 | * | 12/2002 | Arsenault et al. ........... 370/477 |
| 6,505,347 B1 | * | 1/2003 | Kaneko et al. ................ 725/39 |
| 6,529,706 B1 | * | 3/2003 | Mitchell ..................... 455/12.1 |
| 6,567,660 B1 | * | 5/2003 | Wegener ..................... 455/418 |
| 6,571,391 B1 | * | 5/2003 | Acharya et al. ............... 725/87 |
| 6,678,740 B1 | * | 1/2004 | Rakib et al. ................. 709/247 |

FOREIGN PATENT DOCUMENTS

| | | |
|---|---|---|
| WO | WO 99/49663 A1 | 9/1999 |
| WO | WO 00/67449 | * 11/2000 |
| WO | WO 00/67449 A1 | 11/2000 |

OTHER PUBLICATIONS

European Search Report.
Press Release—The Fantastic Corporation Launches v2.0 of Industry's Only End-to-End Solutions for Broadband Multimedia (2 pgs.).

* cited by examiner

*Primary Examiner*—Edward F. Urban
*Assistant Examiner*—John J. Lee
(74) *Attorney, Agent, or Firm*—Darby & Darby P.C.

(57) ABSTRACT

A method and system for booking and scheduling requests for broadcast of programs by a station in which a request has at least a program time duration and required minimum broadcast bandwidth and the station has a fixed bandwidth broadcast capability. A schedule is maintained of programs that have been booked for broadcast, each booked program having a date of broadcast, time for broadcast, time duration and broadcast bandwidth and the request is checked against the schedule of the booked programs for availability of the requested minimum bandwidth for the time duration of the request. The request also can contain a specified time and date for the broadcast. If the request can be satisfied a notice of acceptance is sent and if it cannot, advice is given of this and a listing of alternate times is provided at which the request can be satisfied.

11 Claims, 6 Drawing Sheets

Broadcast System

Figure 1

Broadcast Plan

DECISION SUPPORT METHOD FOR PLANNING BROADCAST TRANSMISSIONS

FIELD OF THE INVENTION

This invention relates to a scheduling and booking method and system to assist broadcast service providers in defining broadcast schedules of programs of different types from a number of program content providers.

BACKGROUND OF THE INVENTION

In present day communications, broadcast service providers are a group of businesses that broadcast programs, such as sports, cartoons, news, documentaries, etc., to public subscribers via media such as a cable system or a satellite network. The broadcast service providers own and operate the facilities from which the broadcasts originate. Construction and operation of these facilities usually involve substantial capital investment. To recoup the investment and make a profit, the broadcast service providers charge fees for the use of their facilities.

Traditionally, broadcast service providers operate their businesses by renting broadcast network capacity to content providers, i.e., organizations that create or aggregate content for the business-to-business or consumer market. Content providers can be producers of virtually any type of program content, such as sports events, drama and comedy shows, business training material, education courses, infomercial, data, etc. Network capacity is basically defined as the amount of capacity (bandwidth) that the operator controls for a facility, this usually being measured in Kbit/sec. The bandwidth typically is a fixed quantity which is a function of the broadcast medium, such as wire or fiber optic cable and satellite. Also, the broadcast service provider often can only operate over a given bandwidth as assigned by a Governmental agency, such as the Federal Communications Commission in the United States. The bandwidth is usually available to the broadcast service provider to rent on a 24 hour per day basis, but this also may be subject to Government regulations and contractual provisions.

Thanks to the availability of network management technology, broadcast service providers have been able to subdivide network capacity and rent single portions (called "transponder space") to content providers to broadcast their material, usually for the ultimate purpose of producing revenue for the content provider. The transponder space rented can be a certain amount or all of the bandwidth available to the broadcast service provider for a certain period of time. For example, a broadcast server provider may have available a 1 megabit/sec capacity and the content provider needs only 200 Kbit/sec to broadcast his content for a one hour time period. Thus, the broadcast server provider has 800 Kbit/sec space to rent to one or more other content providers for the same time period.

Typically, a content provider has had to sign a rental contract commitment (booking) for a considerable amount of network capacity over a long period of time (for example, several hundred hours of 100 Kbit/sec capacity to be used over a six month period). This often required a substantial up front monetary investment by the content provider. The practice of requiring a substantial up front payment and broadcast time commitment was based on the need of the broadcast service providers to secure the business of content providers by contractually binding their customers.

The evolution of content authoring and content management technologies, such as being able to produce content by computer and with a reduced number of people, has created a number of small and medium-size content provider organizations that produce and need to distribute the content that they produce. Such providers would like to benefit from the advantages offered by broadband broadcast networks in distributing the content, but cannot afford the investment required to rent a full or a substantial part of the full transponder space of a broadcast service provider. Also, the long term contractual approach makes it difficult, if not impossible, for content providers with limited financial resources to access the broadcast networks needed to distribute their content.

Due to competition and the advances in technology, the prices of selling transponder space are falling, thereby eroding a main revenue stream of the broadcast service providers. Thus, the broadcast service providers are looking for new ways to increase their revenue. The new market of energizing content providers represents an interesting financial opportunity for broadcast service providers. To accommodate this, the broadcast service providers must try to restructure their businesses to rent a maximum amount of their network capacity, such as by being able to sell pieces of available transponder space to numerous content providers.

Accordingly, a need exists to accommodate both the new type of content providers and the broadcast service providers in being able to address this new segment of business in a manner that provides benefits to each. This requires proper scheduling of the to available transponder space and booking of the program requests from the various content providers.

U.S. patent application Ser. No. 09/046,901 filed Mar. 24, 1998 (PCT WO 99/49663), entitled METHOD AND SYSTEM FOR BROADCAST TRANSMISSION OF MEDIA OBJECTS," which is assigned to the assignee of the subject application and whose entire disclosure is incorporated herein by reference, discloses a new broadband broadcast platform system that supports advanced network management features. The system and method of that application, hereafter called CECTM, assembles content from a number of different content providers, for example, news and infomercials, as well as all other types of content, and provides for distribution of the content at different times of broadcast depending upon the needs of the content provider in the distribution of a particular program. That is, the programs have different durations, require different network capacity and are scheduled for broadcast at different times.

For example, a content provider may want to rent only the network capacity (transponder space) required for one single content transmission, e.g., 128 Kbit/sec, during 50 seconds on a given date. Such a request does not require the need of a long-term rental contract. Through the CECTM a content provider can directly define a broadcast plan by specifying transmission specific parameters such as program desired, start and stop time, required bandwidth and transmission priority. Transmission priority is usually assigned by negotiation between the broadcast service provider and content providers, depending on factors such as price charged for the transponder space at a desired program broadcast time. For example, a content provider pays a low price when he agrees to have his program broadcast at any free time of the network capacity. Such a program would have a low transmission priority as compared to a program guaranteed to be broadcast at a specific time for which the content provider pays a higher rate. Also, priority can be assigned by time of broadcast since the number of potential subscribers available to view a program depends on this, e.g., evening prime time hours as compared to early morning hours.

By using features of the CECTM management system, the broadcast service provider can define new business models based on parameters such as volume of transmitted content, transmission time, content type and number of subscribers. These parameters can be combined to define the cost of broadcast services offered to content providers. For example, the broadcast service provider can decide to charge content providers based on the volume of content transmitted, regardless of transmission time. Alternatively, a higher charge could be applied if the content is transmitted during prime time hours, i.e., a time during which traffic tends to be more intense.

SUMMARY OF THE INVENTION

The present invention relates to a scheduling and booking system and method to be used interactively between content providers who wish to rent transponder space and a broadcast service provider who operates a facility having a defined channel capacity over which programs are to be broadcast. In accordance with the invention, the broadcast service provider operates a computer system that maintains a schedule of programs that are booked for transmission. The schedule includes the program parameters of duration and bandwidth required for transmission, as well as the date and time of transmission.

A content provider who wishes to rent transponder space to broadcast a program submits a request to the broadcast service provider, which request includes at least the program duration and required bandwidth. The request also can include additional parameters, such as a specific time of day for the broadcast and broadcast date.

The system checks the request against the programs already booked for broadcast and advises if the request can be satisfied or rejects the request because of an existing booking. The check made is to determine if the bandwidth is available, this being the difference between the maximum channel capacity and the bandwidth of already booked programs, is sufficient to accommodate the bandwidth needed for the requested program. It is possible that the broadcast channel capacity can accommodate transmission of two (or more) programs at the same time so long as the maximum channel capacity is not exceeded.

If the request also designates specific time and date parameters for the program broadcast, the check can be made specific to such designated times and dates. If a request is accepted, meaning that it can be satisfied, a reply confirmation is generated and the program request is booked on the schedule.

In a preferred embodiment of the invention, if a request cannot be satisfied, the system generates a list of available alternative times and dates that can satisfy the request. The party making the request can select one or more of the available alternatives and resubmit the request. The process of checking the new request against the program booked is repeated and a reply is given whether the new request has been accepted or rejected. If accepted, a confirmation is given and, if rejected, another list of alternatives is provided.

The invention provides a system and method for maintaining a schedule for a broadcast service provider which is able to book or reject additional program broadcast requests based on the available channel capacity and can accommodate scheduling based on a request of program duration and required bandwidth and time and date of broadcast. The invention can be configured to schedule program transmissions from requests made by a plurality of content providers, to maintain a schedule of programs to be transmitted based on program duration and required transmission bandwidth, to accommodate requests for transmission of other programs within the maximum channel capacity of a broadcast station, and to determine if a request of a program broadcast from a content provider can be satisfied based on the duration and bandwidth of the program as compared to programs already booked by a broadcast service provider.

BRIEF DESCRIPTION OF THE DRAWINGS

Other feature, objects and advantages of the present invention will become more apparent upon reference to the following specification and annexed drawings in which.

DETAILED DESCRIPTION OF THE PREFERRED EMBODIMENT

Figure 1:
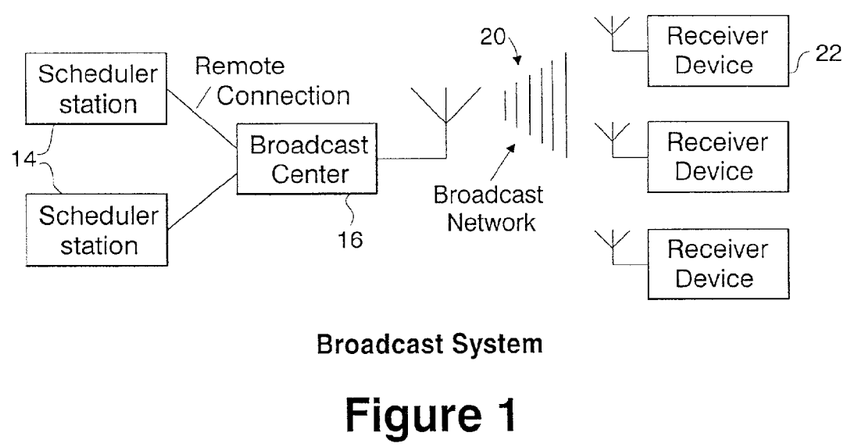
FIG. 1 is a schematic block diagram of a typical broadcast system.

FIG. 1 shows the overall concept of a broadcast system that provides assistance to content providers when planning the distribution of multimedia content to one or more end-user devices 22 over a broadcast network 20. The end-user devices 22 can be any one of a television receiver, personal computer, Web-TV appliance or similar device. The devices 22 receive signals over the network 20 which can be a cable, telephone wires, satellite, or conventional AM or FM broadcast. The receiver 22 is compatible with the network and can include any necessary converter box or circuitry. All of this is conventional.

In FIG. 1, as an illustrative example, a content provider (not shown) desires to request the distribution of certain of its program content. It does this by issuing a broadcast request using a scheduler application (described below) from a scheduler station 14 connected locally or remotely to a broadcast center 16. The scheduler station 14 can be a computer available to the content provider that provides access to the broadcast center 16. This can be done, for example, on the Internet, by modem, or by dedicated line. The broadcast center 16 includes, or is connected to activate, the necessary transmission equipment (not shown), e.g., satellite link transmitter, TV or cable transmitter, etc.

The broadcast center 16 includes the necessary apparatus for a scheduling and booking system, described below, to manage use of the bandwidth available on the broadcast network 20. The broadcast request made by the content provider from the scheduler station 14 includes information used by the scheduling and booking system to determine the availability of the requested exact time or other times for transmission of the content. The system operates to determine a transmission time for each broadcast request of a content provider and ensures that at no time will the amount of bandwidth requested exceed the total amount of bandwidth available at the broadcast network 20. This equipment includes a computer of the necessary capacity that operates with an application program to perform the scheduling and booking process, as described below.

This booking process uses the interaction between the booking system at the broadcast center 16 and the request made by a content provider through the scheduler station 14. This is described in FIGS. 3–6.

Figure 2:
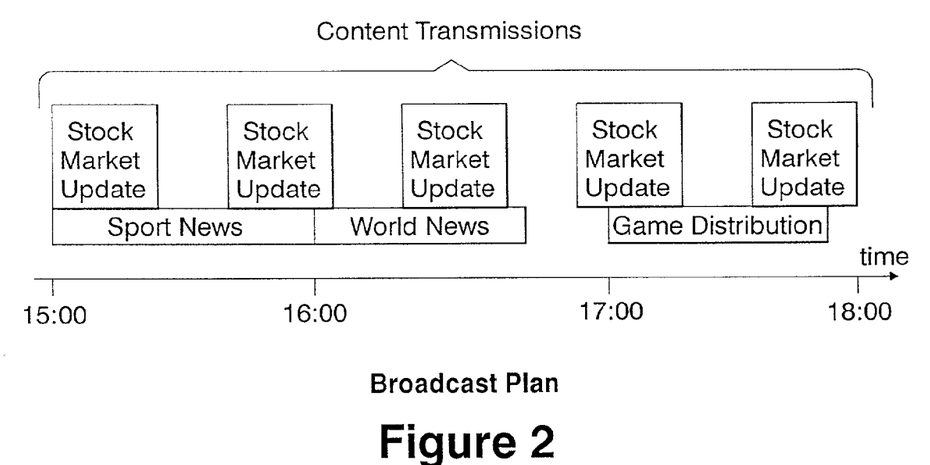
FIG. 2 is a diagram of a broadcast plan.

FIG. 2 shows a broadcast plan of a broadcast service provider, that is, the schedule of programs booked to be broadcast from the broadcast center, for a brief period of time. The plan can include content from one content provider or an assembly of content from different providers. FIG. 2 shows only the time layout plan. As seen, over certain periods of time of one day, e.g., from 15:10 to about 15:20, there are blocks of time for program transmission of both sport news and stock market updates. The two different programs are broadcast at the same time but on different portions of the bandwidth spectrum available to the broadcast service provider. At a later time, shown as about 15:30, a stock market update is broadcast at the same time as the sports news and continues over from about 16:00 to 16:05 with world news. Another stock market update is to be broadcast from about 16:20 to about 16:46 together with the world news which continues to about 16:45. The remainder of the program content is similarly analyzed show to somewhat past 16:00.

The broadcast plan of FIG. 2 is kept by the computer of the broadcast service provider over a period of time limited basically only by the capacity of the booking system computer. That is, there is a schedule of all of the programs booked for transmission by the network. This will include many programs of different duration and having different bandwidth requirements. The broadcast service provider must keep the schedule on an accurate up-to-date basis and assure that adequate bandwidth is available for all booked programs.

Figure 3:
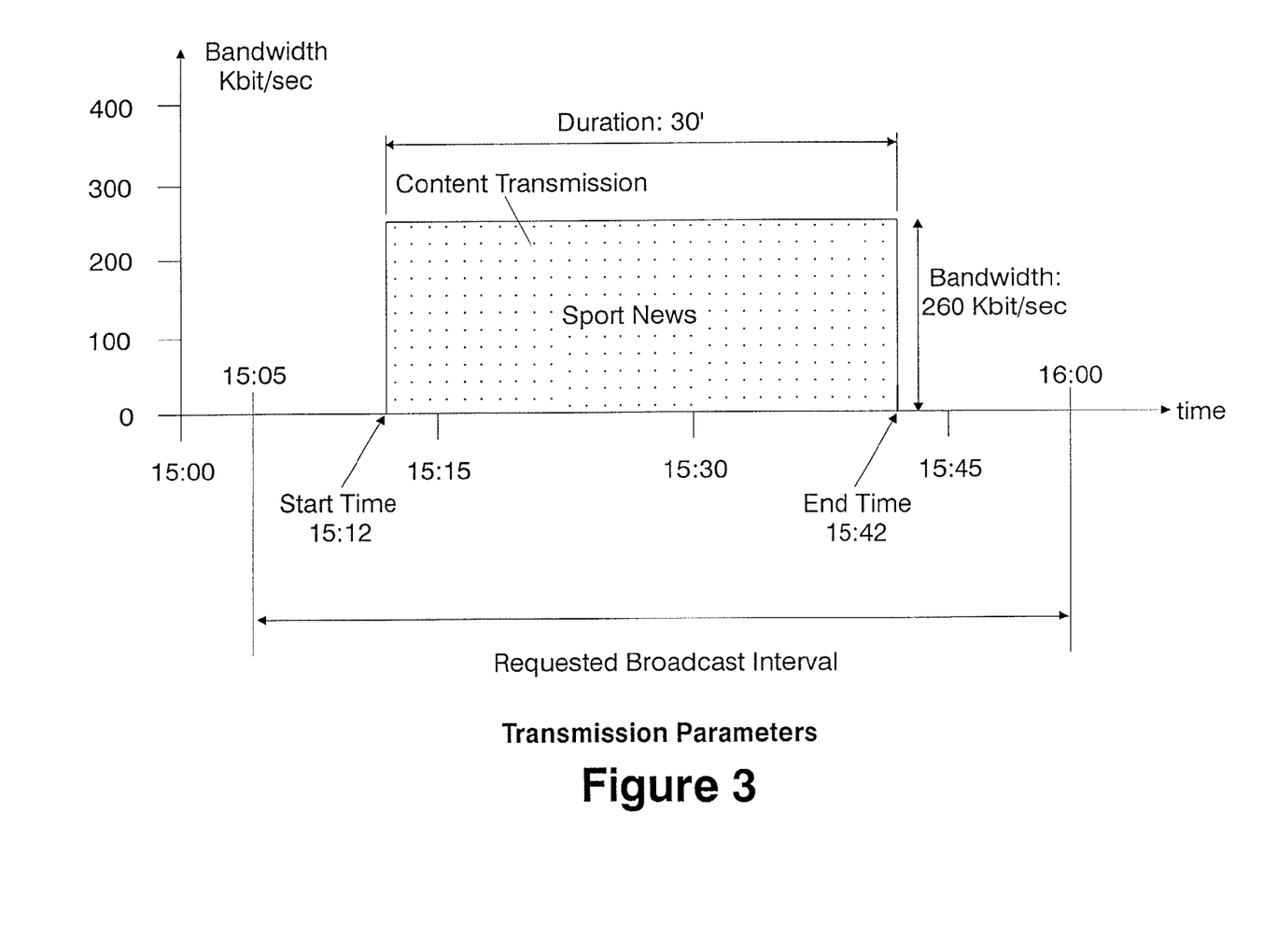
FIG. 3 is a diagram showing various transmission parameter requirements.

FIG. 3 shows the broadcast transmission parameters of a sample program. This is the information of the request that is transmitted by the scheduler user 14 to the scheduling and booking system at the broadcast center 16. The information is:

| content: e.g. sport news | (optional) |
| duration-30 minutes | (required) |
| bandwidth required-260 kbit/sec | (required) |
| requested broadcast interval | |
| start 15:05 | (required) |
| end 16:00 | | where start and end are meant to include date and time. The requested broadcast interval RBI is the time interval specified by the scheduler user during which he or she expects the content to be sent out. As described below in connection with FIG. 6, the booking system attempts at step 105 to determine if the transmission can be executed during the RBI. If not, at step 107, alternative transmission times outside the RBI are examined and, if any are found, they are proposed to the scheduler user. It should be understood that the RBI is at least as long in time as the required transmission duration, but otherwise can be of any length. A long RBI indicates that the user has ascribed a lower priority to the requested transmission because it permits the booking system to schedule the transmission far into the future.

The goal of the scheduling and booking system at the broadcast center 16 is to verify the availability of broadcast resources in order to accommodate the scheduler user request into the broadcast center.

In the example shown of sports news, the broadcast start and end times are arranged in such a way that the broadcast takes place in the time frame requested by the scheduler user, e.g., start time 15:05 and end time 16:00. The open ended start and end lines could give to the request a lower priority and a lower pricing rate, since the broadcast service provider can satisfy the request at any time that bandwidth is available.

Figure 4:
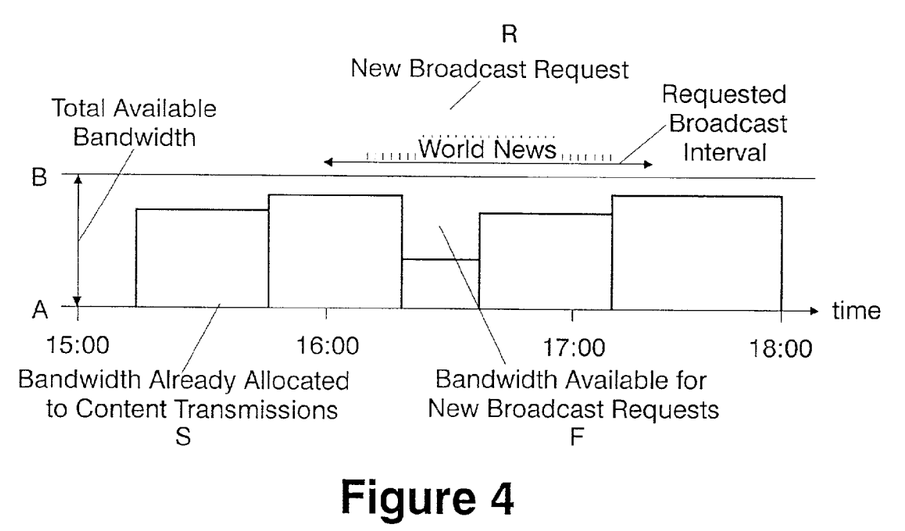
FIGS. 4 and 5 are diagrams of broadcast satisfaction requirements.

FIG. 4 shows the checking of whether or not a broadcast request can be satisfied. Here, the request that is to be checked is the world news, shown in a dotted (time) block R, with the duration, here in a requested start-end time period, on the horizontal axis. The height of the block R represents the bandwidth required to broadcast the program.

Shown below the program request block R are the already scheduled program content blocks S, with the time being on the horizontal axis and bandwidth (vertical height of the blocks on the vertical axis). The information of each of the blocks S, the schedule of the already accepted booked requests, is already stored in the booking system computer.

In FIG. 4, the total available bandwidth of the broadcast service provider is shown between the two horizontal lines A and B. If no program has been booked for a particular time period, the space between lines A and B would be empty. The space F above each booked program block S to the line B indicates the bandwidth that is free and can accept one or more additional programs for broadcast. As can be seen, because of its required bandwidth, the program request R can be satisfied only during the time period of the middle one of the already scheduled blocks S. This is not sufficient to satisfy the request which requires a longer time duration.

Figure 5:
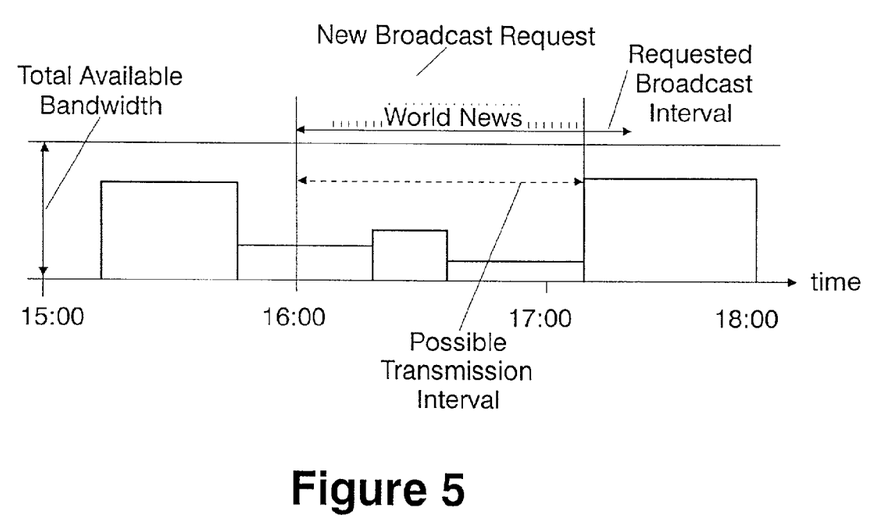

FIG. 5 shows a situation where the same duration and bandwidth request R as in FIG. 4 is made for the same time but perhaps on a different situation. Here, the request R can be satisfied during the time period from about 16:00 to 17:15 since there is available bandwidth. The request also could be satisfied starting about 15 minutes earlier, but the requested broadcast interval does not start so early.

Figure 6A:
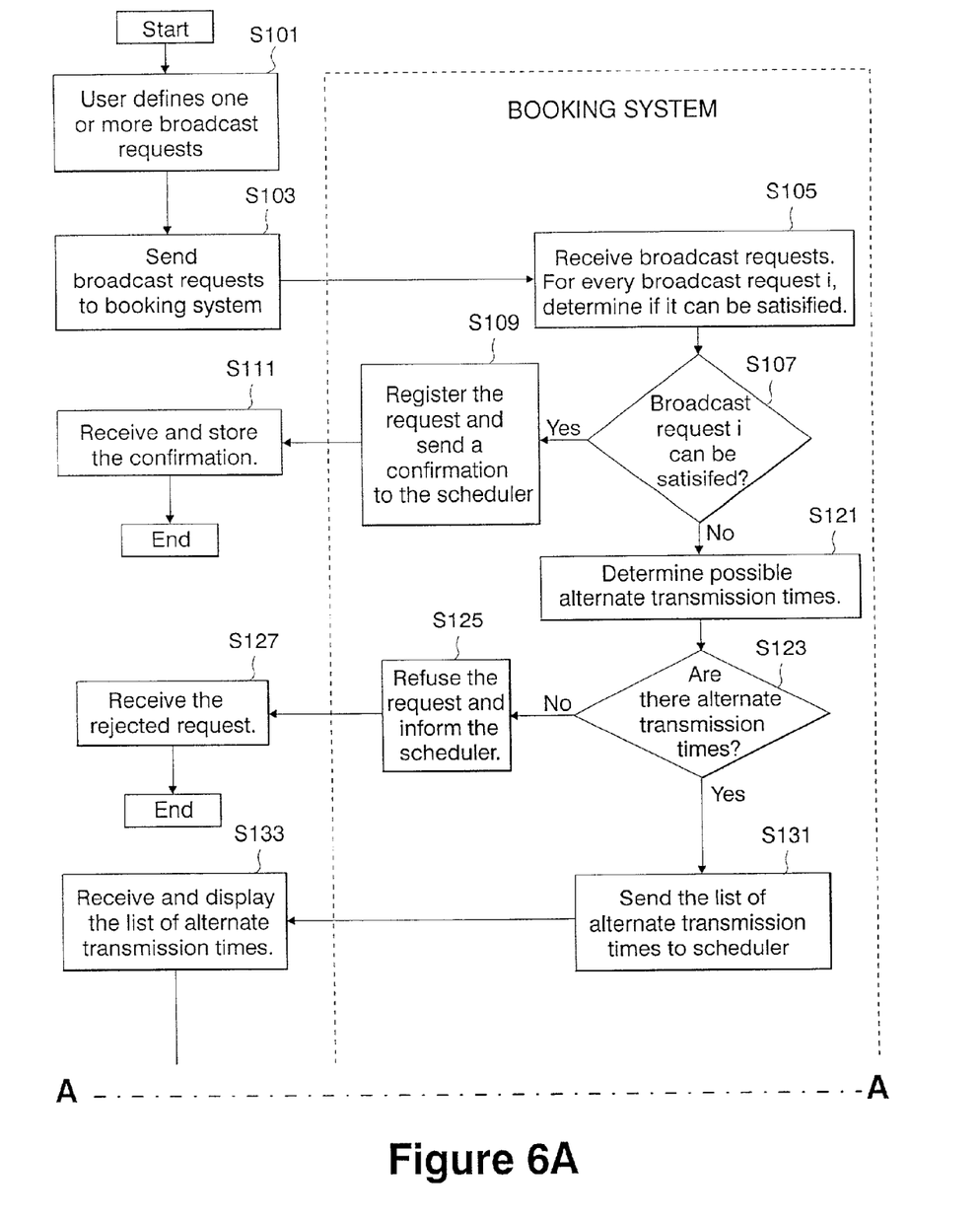
FIG. 6 is a flow chart of the system and method.
Figure 6B:
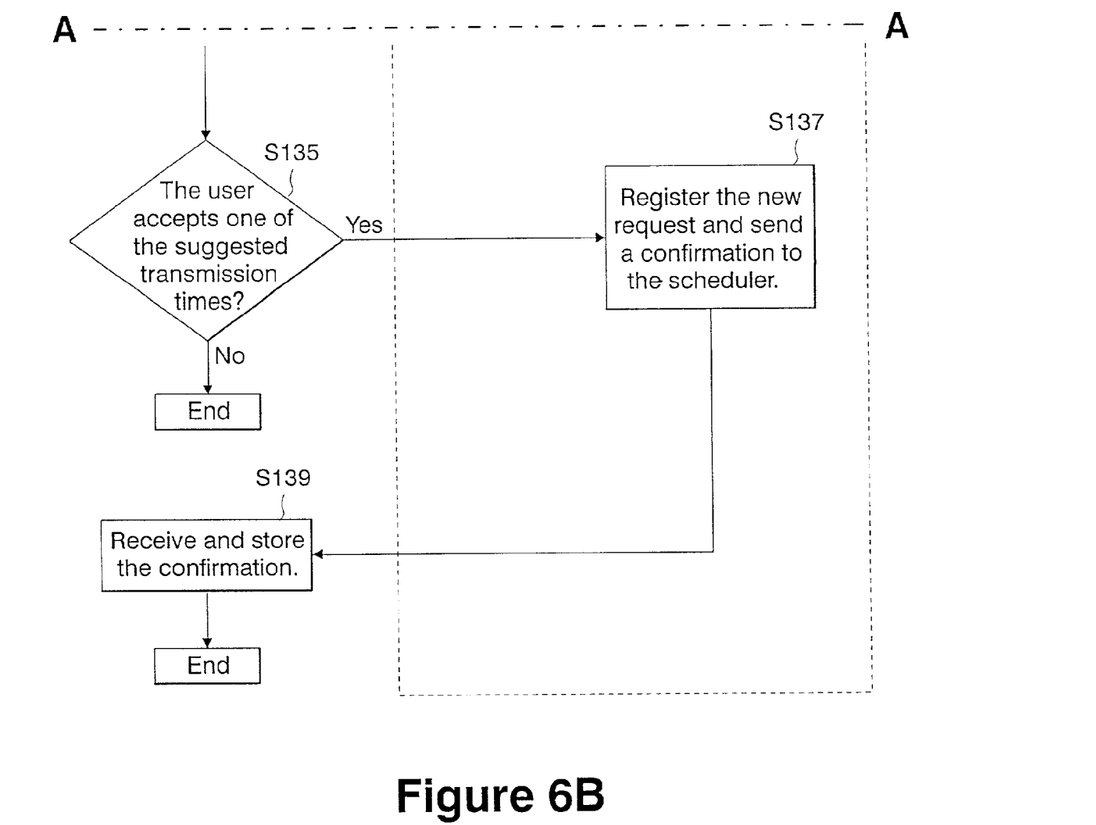

FIG. 6 is a flow chart of the operation of the system and method. In S101 the content provider defines one or more broadcast requests and the associated parameters. As a minimum the request includes program duration and the bandwidth required for broadcast. The time of broadcast and desired date also can be provided. The content, e.g., news, sports, etc., preferably is also provided for information purposes. If the content provider does not know the required bandwidth, a sample of the content can be sent to the broadcast center for analysis. It should be noted that a broadcast request can be made minutes, hours, days, weeks or months in advance of the actual broadcast. Also, the actual content to be broadcast even may not be available at the time the request is made. In fact, the content is not required to be available until actual broadcast time.

A broadcast request preferably is entered in a standard format this is understood by the computer of the scheduler 14 and the booking system. Typically, the scheduler has a data entry screen with fields in which to enter the various request parameters. In S103, the broadcast request is sent to the booking system by the scheduler station 14. A number of requests can be sent in serial form as a batch transmission.

The booking system receives the requests in S105. Each request is checked in S107 for the availability of bandwidth over the required program time duration and usually during a requested specified time frame (start and end time). This is described with respect to FIGS. 4–5. A request for a specified time can be made to be satisfied for only one day or for any fixed number of days. That is, a schedule is kept in the booking system computer and is consulted for each request made. If the requested required bandwidth for the program duration is open, so that the transmission can be executed as requested, the booking system in S109 books the request and informs the scheduler station accordingly. The content provider receives the confirmation of the booking of his request and stores it in S111.

If the transmission cannot be executed as requested, because the time has already been booked and/or there is not enough bandwidth available, as explained in FIGS. 4–5, the system determines in S121 and S123 if the request can be properly executed at a different time. In order to find alternate transmission times the booking system extends its checking of the program transmission duration and bandwidth requested by the content provider through the scheduler station. That is, when a request has been rejected and a set of available alternate times/dates is to be generated, the computer takes the request R and checks it against the booked programs S on the schedule over a period of time. This can be before or after a requested time. The schedule is the booked programs, each with a start and end time, along a horizontal time line and the bandwidths of the programs in the vertical direction as shown in FIGS. 4–5. The program request (FIG. 3) is scanned against this schedule data set to see what time and dates are available to accommodate it (see FIGS. 4–5). The booking system can be programmed to seek alternate broadcast times in any format, e.g., for certain times of any one or more days (Monday to Sunday), at given times during the day, and to the end of a calendar date. These factors also can be specified in the request.

If no alternate transmission time is found, in S125 the booking system rejects the broadcast request and informs the scheduler station 14 who receives the notice in S127. The content provider typically would then seek another broadcast service provider.

If alternate transmission times are possible to satisfy the request, in S131 the booking system sends a list of these to the scheduler station 14. In S133, the alternate time or times are proposed, such as on a display, to the user at the scheduler station for consideration by the user. In S135 if the user accepts one of the suggested alternatives, this acceptance is sent as a new request to the booking system where it is again checked for availability and booked in S137. A confirmation is sent to the user in S139 and the program is booked for transmission.

While not shown in FIG. 6, the cancellation of a booked program also can be accommodated. That is, if a content provider wishes to cancel a confirmed and booked request, assuming it is permitted to do this under terms of the booking contract, a cancellation notice is sent from the scheduler station 14. The booking program removes the program time that has been booked and this is again made available for booking to satisfy a new request. It should be understood that each confirmation typically is assigned and identification number with which the booking is associated. The system computer can use this number to easily identify the specific parameters of the booking to be cancelled.

In the preferred embodiment of the invention (see FIG. 7), the scheduler station 14 allows the content provider user to define the broadcast plan off-line. For that purpose, the scheduler station includes a local database 42 that stores broadcast requests before they are submitted to the booking system in the broadcast center 16. As mentioned above, broadcast requests can be defined and submitted before the corresponding content is available. The basic information necessary for making the request, the minimum bandwidth required and content size, that is, the length of time of the program. The content type, e.g., audio/video streaming, file, data streaming also is usually provided as information to the broadcast service provider. Other information can be submitted such as preferred broadcast times (start-stop) and dates.

Figure 7:
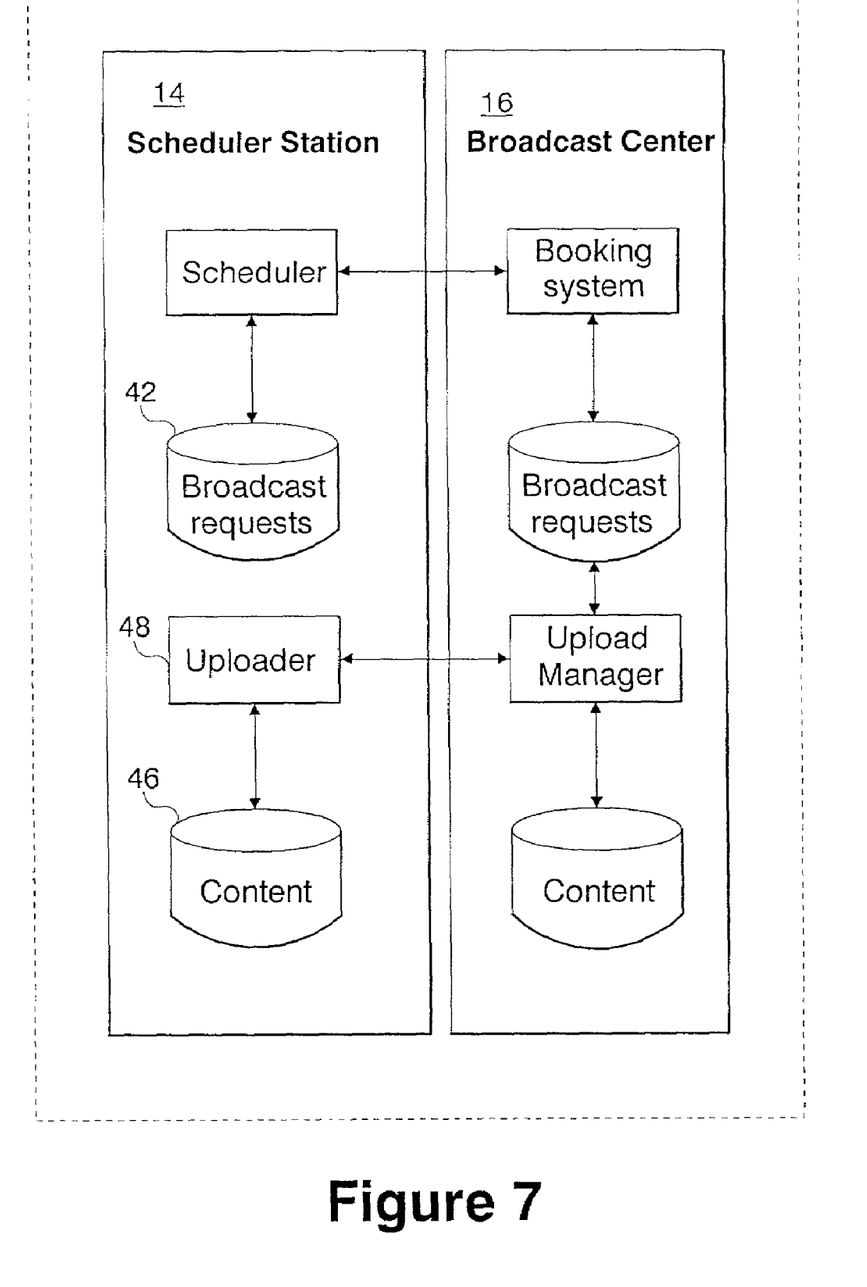
FIG. 7 is a diagram of a scheduler station and broadcast center.

The program content has to be transferred to the broadcast center 16 before the transmission is supposed to start. Content can be uploaded to the broadcast center in two different ways as shown in FIG. 7:

1. The content provider sends the actual program content 46 from the scheduler station 14 upon reception in either S111 or S139 of a confirmation of the broadcast request. The content provider can transfer the associated content to the broadcast center by any suitable medium, such as over any standard TCP/IP (Internet) connection designated as an uploader 48. The content is stored at the broadcast center 16 until it is needed for broadcast.

2. The network operator, i.e., broadcast service provider, working directly at the broadcast center can load the content on the content repository of the broadcast center and make it available to the content provider.

The foregoing embodiments demonstrate methods and devices implemented and contemplated by the inventors in making and carrying out the invention. While the invention has been particularly shown and described with reference to the preferred embodiments thereof, the embodiments are not intended to be exhaustive or to limit the invention to the precise forms disclosed herein. It will be understood by those skilled in the art that various changes in form and detail may be made therein without departing from the spirit and scope of the invention. Numerous equivalent methods, devices, and techniques may be employed to achieve the same result. Similarly, any process steps described may be interchangeable with other steps in order to achieve the same result. It is intended that the scope of the invention is defined by the following claims and their equivalents.

We claim:

1. A method for booking and scheduling a request made by a first party to a second party for broadcast at a preferred time of first party controlled program content having at least one of audio and video information of a given time duration and having a required minimum broadcast bandwidth to be broadcast by a station associated with the second party and has a fixed maximum bandwidth broadcast capability comprising the steps of:

said second party maintaining a schedule of programs that have been booked for broadcast by the station, each booked program having a date of broadcast, time for broadcast during the day, time duration and broadcast bandwidth;

said first party submitting a request for broadcast of first party program content by the station to said second party with the request having the parameters of program time duration, required bandwidth and a preferred broadcast time during one or more days of a week; and said second party checking the request against the schedule of already booked programs scheduled for broadcast for availability of the requested minimum bandwidth for the time duration and preferred time of broadcast of the request made by said first party.

2. The method of claim 1 further comprising the step of said second party replying to the request made by a said first party by providing a listing of times and dates that the request can be satisfied.

3. The method of claim 1 wherein the request made by said first party further includes a certain date of broadcast and further comprising the step of said second party replying as to whether or not the request can be satisfied.

4. The method of claim 3 wherein the step of replying by said second party further comprises providing a listing of alternate dates and times that the request made by said first party can be satisfied if the original request of said first party cannot be satisfied.

5. The method of claim 1 further comprising the step of said second party replying that the request has been accepted; and uploading the first party program content of the request to a broadcast station.

6. The method of claim 5 wherein the program content is uploaded by said second party after receipt of the reply of the acceptance of the request made by the said first party that made the request.

7. The method of claim 6 wherein the step of scanning composes:

comparing the minimum bandwidth of the program request to the difference between the fixed bandwidth and the bandwidth of any program that has been booked.

8. The method of claim 5 wherein the program content is uploaded by said second party only shortly prior to the time of broadcast.

9. The method of claim 1 wherein the step of said second party maintaining the schedule comprises maintaining a computer data file of the booked programs of program duration, bandwidth and time and date of broadcast, and the step of checking comprises placing the time duration, minimum bandwidth and preferred time of broadcast of the program content of the request made by a said first party in computer data form, and scanning the computer data form of the request against the data file.

10. The method of claim 9 wherein each of multiple requests of one or more first parties for broadcast at the same time are placed in computer data form, and the computer data form of the multiple requests are compared to determine if the total bandwidth needed to satisfy the multiple requests is within the maximum bandwidth capability of the station.

11. The method of claim 1 wherein the second party books multiple requests of one or more first parties for broadcast at the same time provided that the total bandwidth of the multiple requests does not exceed the maximum bandwidth capability of the station.

* * * * *